(12) United States Patent
Honisch

(10) Patent No.: US 8,073,795 B2
(45) Date of Patent: Dec. 6, 2011

(54) LOCATION BASED SERVICES PLATFORM USING MULTIPLE SOURCES INCLUDING A RADIO FREQUENCY IDENTIFICATION DATA SOURCE

(75) Inventor: Guenter Honisch, Velmerstrasse (AT)

(73) Assignee: Symbol Technologies, Inc., Holtsville, NY (US)

( * ) Notice: Subject to any disclaimer, the term of this patent is extended or adjusted under 35 U.S.C. 154(b) by 986 days.

(21) Appl. No.: 11/970,336

(22) Filed: Jan. 7, 2008

(65) Prior Publication Data
US 2009/0177603 A1 Jul. 9, 2009

(51) Int. Cl.
*G06F 17/00* (2006.01)
*G06N 5/00* (2006.01)

(52) U.S. Cl. .................. 706/45; 706/47; 706/62

(58) Field of Classification Search .......... None
See application file for complete search history.

(56) References Cited

U.S. PATENT DOCUMENTS

| 7,142,876 | B2 | 11/2006 | Trossen et al. |
| 7,487,014 | B1 * | 2/2009 | Houlberg ........................ 701/3 |
| 2003/0120424 | A1 * | 6/2003 | Angwin et al. ............... 701/213 |
| 2004/0107046 | A1 * | 6/2004 | Zink et al. .................... 701/207 |
| 2006/0281471 | A1 | 12/2006 | Shaffer et al. |
| 2007/0018890 | A1 | 1/2007 | Kulyukin |
| 2007/0149208 | A1 | 6/2007 | Syrbe et al. |
| 2007/0239356 | A1 * | 10/2007 | Woz .............................. 701/213 |
| 2007/0270163 | A1 | 11/2007 | Anupam et al. |
| 2008/0201385 | A1 * | 8/2008 | Winberry et al. ............. 707/200 |

FOREIGN PATENT DOCUMENTS
WO 2009088650 7/2009

OTHER PUBLICATIONS

International Search Report and the Written Opinion of the International Searching Authority for International Application PCT/US2008/086778 mailed Feb. 4, 2009.

* cited by examiner

*Primary Examiner* — Jeffrey A Gaffin
*Assistant Examiner* — Adrian Kennedy

(57) ABSTRACT

System and methods are provided that facilitate integrated and seamless utilization of location data generated by multiple disparate positioning technologies adequate for outdoor or indoor positioning. Location data from multiple sources is selectively processed based on rules that account for availability, accuracy, cost, reliability of location data. At least one of the multiple sources is based on radio frequency identification (RFID) technology. Rules can be operator specific or can be automatically generated based on historic location data or cost-benefit analysis. Processing of selected data includes formatting data according to a specific standard or protocol, or augmenting the data with metadata. Standardized data is conveyed through a communication link for utilization in various applications such as vendor applications for navigation or web-based services, as well as custom and development applications.

19 Claims, 10 Drawing Sheets

LOCATION BASED SERVICES PLATFORM USING MULTIPLE SOURCES INCLUDING A RADIO FREQUENCY IDENTIFICATION DATA SOURCE

TECHNICAL FIELD

The subject innovation relates generally to location based services and, more particularly, to a platform that delivers integrated standardized location information from multiple sources, each associated with a specific technology.

BACKGROUND

Advances in communications at the device and service level have made applications reliant on location based services, such as navigation systems, nearly ubiquitous in modern society. Technologies typically associated with the military, government, and large enterprise operations are now accessible to a substantial segment of consumers in multiple markets such as transportation, customer service, logistics, and healthcare. In view of such a market shift and proliferation of positioning services, multiple positioning technologies have been developed and refined, providing location data with various levels of accuracy and reliability that serve historic users as well as the newly added segments of consumers.

Such positioning technologies are generally adequate for specific environments, like outdoor environments in which the technologies generally operate in open-sky configurations, or indoor environments which typically require specific infrastructure for the technology to deliver location data. In addition, devices employed for navigation typically employ location data generated from a specific technology, being commonly limited to accessing location information in exclusively outdoor environments or indoor environments. Moreover, devices that utilize location information typically provide location data to specific applications commonly designed for a specific location service provider. Furthermore, location information delivered by typical devices is in general bound within a predetermined accuracy, degree of reliability, or trust level, and a cost which is usually dictated by the location service provider. Therefore there is a need in the art for the capability to utilize integrated location data in various applications, the location data originated from disparate technologies within disparate accuracies and associated costs.

SUMMARY

The following presents a simplified summary of the innovation in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the innovation in a simplified form as a prelude to the more detailed description that is presented hereinafter.

System and methods facilitate integrated and seamless utilization of location data generated by multiple disparate positioning technologies adequate for outdoor or indoor positioning. At least one of the multiple disparate positioning technologies is based on radio frequency identification (RFID) technology. Positioning technologies can also include satellite and earth-based navigation system, wireless technology, as well as barcode labels. Location data is received through a technology interface and integrated in data storage. Based on rules that account for availability, accuracy, cost, reliability of location data, location data from multiple sources is selectively processed. Rules can be operator specific or can be automatically inferred based on historic location data or cost-benefit analysis. Rules can be valid for a specific period of time and can depend on operator in order to allow disparate level of access to location data in cases where data is sensitive. Processing of selected data includes formatting data according to a specific standard or protocol, or augmenting the data with metadata. Standardized data is conveyed through a communication link, which can be wired or wireless, for utilization in various applications such as vendor applications for navigation or web-based services, as well as custom and development applications. Development applications can include applications for location data validation and correction.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
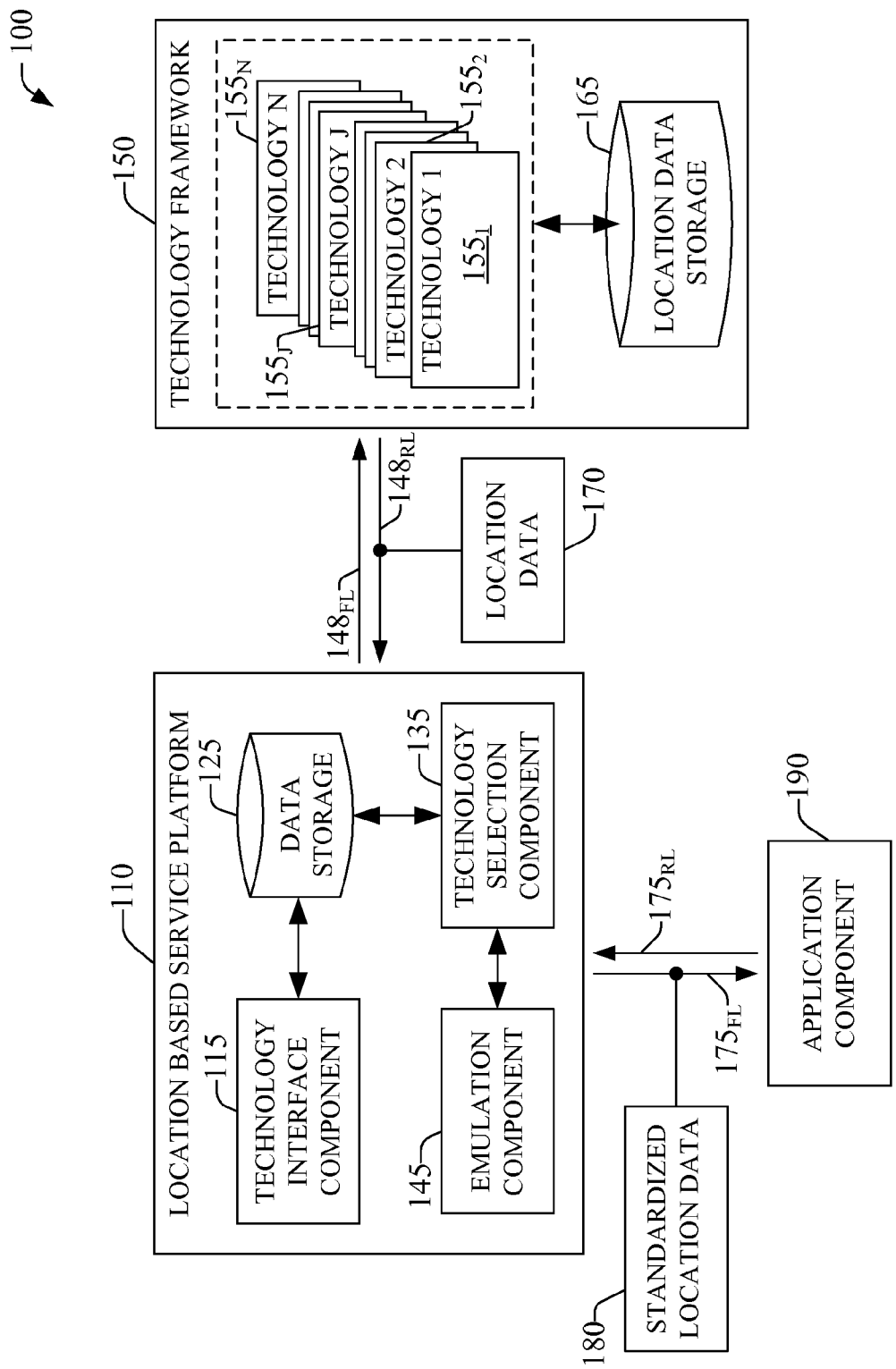
FIG. 1 illustrates an example system that facilitates integration and utilization of location data arising from multiple positioning technologies.

The subject innovation is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "system," "module," "framework," "platform," "application," and the like are intended to refer to computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). In the subject description the terms "interface component" and interface are employed interchangeably.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In the subject disclosure, system and methods are described that facilitate integrated and seamless utilization of location data generated by multiple disparate positioning technologies adequate for outdoor or indoor positioning. Location data from multiple sources is selectively processed based on rules that account for availability, accuracy, cost, reliability of location data. Rules can be operator specific or can be automatically generated based on historic location data or cost-benefit analysis. Processing of selected data includes formatting data according to a specific standard or protocol, or augmenting the data with metadata. Standardized data is conveyed through a communication link for utilization in various applications such as vendor applications for navigation or web-based services, as well as custom and development applications. Details of these aspects are discussed next.

Referring now to FIG. 1, illustrated therein is an example system 100 that facilitates integration and utilization of location data arising from multiple technologies that facilitate generation of positioning information. A location based service platform 110 comprising a technology interface component 125, data storage 135, a technology selection component 115, and an emulation component 145 receives location data 170, via reverse communication link $148_{RL}$, from a technology framework 150 that includes multiple technologies $155_1$-$155_N$ which can deliver positioning data. Location data 170 is integrated within the location based service platform 110. It should be appreciated that technology interface component can receive location data 170 from the technologies $155_1$-$155_N$ through technology-specific interfaces. The technologies $155_1$-$155_N$ generate the location data 150 for outdoor and indoor positioning of an object according to the particular operational characteristics of each technology. The location data can be stored in location date store 165 which can reside in technology framework 150. Location data 170 is generally conveyed in the native format association with the technology that generates it. The object typically is user equipment, stationary or wireless, that receives signals from, and/or transmits signals to, a source associated with the technology and which are employed for location determination. Location data 150 is generally stored (e.g., in data storage 135) and processed (e.g., through emulation component 145) in location based service platform 110, and conveyed through communication link $175_{FL}$ in a standardized form, e.g., standardized location data 180, to an application component 190. The application component 190 can comprise multiple vendor applications and custom applications. It should be appreciated that location data is integrated in location based service component 110, which facilitates seamless utilization of location data from multiple sources (e.g., technologies). Functionality of the components comprising location based service platform 110 is discussed next.

Technology interface component 115.—This component receives location data 170 and integrates such data; generally in data storage 125. A service provider associated with location based service platform 110 can establish multiple technology interfaces that can receive data for multiple technologies. In an aspect, technology interface component 125 can possess functionalities associated with data reception from multiple technologies; for instance, it can have transceivers (e.g., multiple antennas) and associated electronics, such as multiplexing circuitry, modulation and demodulation electronics which can implement modulation/demodulation protocols like OFDMA or CDMA wireless communication for multiple-input multiple-output operation; correlator circuitry to acquire control and pilot wireless signal; and so on. Alternatively, or in addition, technology interface component can interface with a wired technology, such as inertial navigation components; e.g., a gyroscope, an accelerator and the associated electronic circuitry. Technology interface component can also include electronic circuitry to probe radiofrequency identification tags, and to scan barcode labels.

It should be appreciated that technology interface component 115 can be upgraded according to operator demand and cost-benefit analysis. Upgrades can be also be employed as a marketing tool for the location based service platform 110, wherein a service provider can activate specific technology interfaces for a period of time in order for an operator to test such interface and determine whether the interface meets the operator's personal and/or commercial needs. In addition, technology interfaces, and an associated location service can be offered on pay-per-service terms wherein the service provider can charge a fee for the operator to access location service information within various levels of spatial resolution. It is noted that a specific interface in technology interface component can be activated via hardware, through jumper combinations in a circuit board, or software. Software activation can be accomplished remotely or it can be accomplished by downloading (through a wired or wireless link) desired interface, computer-executable components (e.g., drivers) from a website.

Data storage 125.—Location data 170 received via link 148 through technology interface component 115 is stored for further process and utilization. Typically data storage 125 is embodied in a memory. Historical data can be aggregated to new data, and such historical data can be employed to determine rules that facilitate positioning technology selection.

Technology selection component 135.—Location data stored in data storage 135 can be selected based upon rules, which can be user-specific rules as well as default, initial-configuration rules that can be predetermined for the location based service platform 110 by a service provider associated with such service platform. Rules can be based at least in part on factors such as technology availability (e.g., open-sky access or indoor positioning), accuracy and time to retrieve location data, cost, and reliability (e.g., channel quality information or signal-to-interference-and-noise ratio (SINR)) of positioning technologies $155_1$-$155_N$. It is noted that one or more of such factors can be related or mutually dependent on one another; e.g., accuracy of retrieved location data can be affected by SINR. Moreover, rules can be valid for specific periods of time and updated according to changes in the above factors; for instance, an operator can determine that a first technology is to be used when SNIR is above a threshold, switching to a second technology otherwise. It should be appreciated that changes in rules can be automated.

Emulation component 145.—As discussed above, location data 170 integrated in data storage 135 can be processed and employed by an application component 190. Processing is conducted by emulation component 145, which can manipulate the integrated location data to conform to a standard format suitable for utilization in a specific application, e.g., in application component 190. In an aspect, emulation component can cast all received data in a format such as NMEA-0183 and facilitate communication of the formatted data through forward link $175_{FL}$ as standardized location data 180. It is noted that, in another aspect, communication of standardized location data 180 can be conveyed via technology interface component 115.

Referring to technology framework 150, as an example, one of the technologies $155_1$-$155_N$ can be a global positioning system (GPS) which employs satellites to communicate microwave signals to the user equipment that convey information (e.g., time, satellite orbits) that can be utilized to compute a location of the user equipment. Another technology can include GPS augmented through WAAS, inertial navigation system or dead reckoning, or differential GPS. Yet another technology can be associated with a service provider of cellular (radio) wireless communication that provides cell identification information through control data conveyed to the user equipment. Further, a technology can rely on a wireless local area network which can be deployed indoor or in specific outdoor spaces such as parking lots, city parks, etc. Still further, a technology can deliver location data 150 based on radiofrequency identification (RFID) active and passive tags, as well as on barcode labels or identifiers based on linear as well as two-dimensional symbologies. It should be appreciated that technologies $155_1$-$155_N$ in technology framework 150 can be deployed in disparate environments/locations. In particular, in an aspect, a technology (e.g., technology J $155_J$) can reside within the location based service platform 110.

Figure 2:
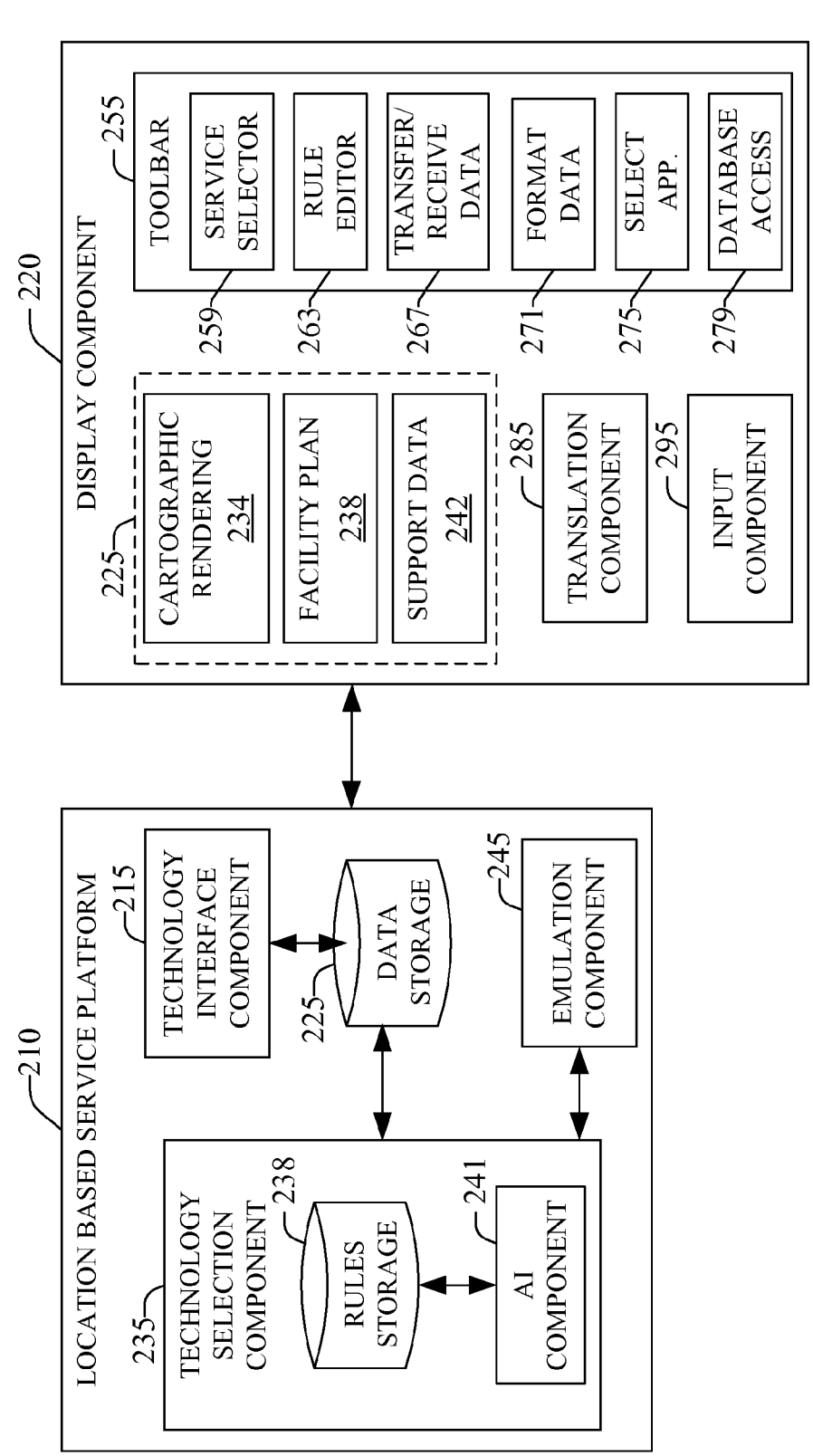
FIG. 2 illustrates an example system that facilitates interaction and information utilization or manipulation from a location based service platform.

FIG. 2 illustrates an example system 200 that facilitates interaction and information utilization or manipulation from a location based service platform. In embodiment 200, location based service platform 210 possesses substantially the same functionality as that of location based service platform 110 described above—such functionality is conferred by a technology interface component 215, a data storage 225 that stored location data (e.g., location data 170), a technology selection component 235, and an emulation component 245. A display component 220 can exploit such functionality and can display location data extant in data storage 225. In addition, display component 220 can be utilized to interface with an application component (e.g., application component 190); for example, by rendering data generated in an application. It should be appreciated that display component 220 can reside within location based service platform 210 or vice versa. Features of example embodiment 200 are discussed next.

Upon gathering location data from various sources (e.g., technologies $155_1$-$155_N$) through technology interface component 215 and integrating such data in data storage 225, technology selection component 235 relies on rules to extract a specific set of location data for utilization in an application (not shown). Rules can be stored in rules storage 238, which can be embodied in a memory, and as discussed above such rules can be basic, generic rules or user-specific rules. In one aspect of example embodiment 200, the rules can be automatically modified or generated through artificial intelligence component 241. The term "intelligence" refers to the ability to reason or draw conclusions about, e.g., infer, the current or future state of a system based on existing information about the system. Artificial intelligence (AI) can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system. AI component 241 can determine a source of location information to access, typically through technology interface component 215, or what type of location data stored in data storage 225 is to be utilized. Such a determination can be based on rules originated from an automatic inference; the rules can be stored in rules storage 215 for temporary use, or can be persisted for further use when encountering scenarios similar to that which led to inferring the rules. Rule inference can be based on cost-benefit analysis; e.g., accessing location information via an expensive service can result in an expeditious completion of a task, such as repairing a high-voltage transformer, that can in turn support maintaining a high quality of service to a customer; thus, making the benefit outweigh the cost of accessing the location service. In another aspect, in addition, or alternatively, to cost analysis, by exploiting the functionality of a technology interface component (e.g., component 215 or 115), AI component 241 can search for (i) a technology that delivers a better service as measured by CQI, data rate, fix determination speed, and so on; or (ii) a more inexpensive service.

Rule inferences can also be based on historical location data or existing, persisted rules. Persisted and historical information can be typically employed for machine learning (either supervised or unsupervised) by AI component 241 in order to simulate human judgment when creating a rule. To that end, AI component 241 can utilize one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing automated aspects of rule generation for positioning technology selection.

In example embodiment 200, display component 220 acts as a human-machine-interface and can reside or be operatively coupled (e.g., receive/transmit data, instructions, or code snippets; actuate specific operations; effect changes in memories; or request specific operations from a processor, and so on) to substantially any entity that exploits a location service based platform such as a vehicle, a vessel, an aircraft, or a spacecraft, or portable or wearable user equipment. Such display component 220 includes a display area 225 wherein information is rendered; typically the rendered information is associated with, or generated by, an application such as a navigation application. As illustrated in FIG. 2, a cartographic rendering 234 and a facility rendering 238 can be conveyed in display area 225. It should be appreciated that substantially any information generated through location data can be rendered in display area 225; for instance, scheduled tasks and patient names can be displayed for a healthcare provider, or a location stamp can be presented to a logistics specialist scanning items for delivery or recovery. Additionally, a toolbar 255 can be a functional part of display component 220. Such a toolbar can also be rendered in a display area (e.g., display area 225) within the display component and can provide access to multiple services that can be delivered, or complemented, by location based service platform 210: (1) Service selector 259. This functional element of toolbar 255 can allow an operator to the select a specific positioning technology to be accessed, via a technology interface component (e.g., component 215), to receive location data (e.g., location data 170). In an aspect, service selector 259 can allow an operator to override rules for service/technology selection that are employed by technology selection component 235.

(2) Rule editor 263. An operator can create or edit/modify existing rules for selecting positioning technologies. Rule editor 263 can also enable or disable utilization of AI component 241 to infer rules in technology selection component 235.

(3) Transfer/receive data 267 allows to convey standardized location data 180 to an application (for example, an application that resides in application component 190), and it allows to receive location data. It should be appreciated that while a location based service platform 110 can listen for data in an always-on fashion, such a feature can be disabled based on an energy preservation criterion and thus location data collection can be triggered on demand through transfer/receive data 267.

(4) Format data 271. Format data can operate in conjunction with emulation component 245 to deliver or present data in a desired format. Stored location data, e.g., data stored in data storage 225, gathered from disparate technologies can also be merged to provide a rich display of information. As an example, point of reference, or landmark, information can be combined with GPS data to provide specific points of reference during a trip. In another example, real-time parking availability information in multiple parking lots in a downtown can be combined with a cartographic rendering (e.g., cartographic rendering 234) of the downtown. In yet another example, traffic light information can be merged with location data and rendered in display area 225 as support data 242. Furthermore, validation algorithms can be employed to assess reliability of location data that is being rendered, e.g., in a cartographic rendering 234 or a facility plan 238. In an aspect, validation algorithms can include models for location data adjustment, such as ionosphere model or microwave dispersion models which can be relevant for adjusting GPS data. Other models can incorporate algorithms for multi-path corrections, or noise smoothing, on location data (e.g., location data 170) gathered from multiple positioning technologies.

(5) Select application 275. Various applications which can reside in an application component (e.g., application component 190) can be launched through such functionality in toolbar 255. It should be appreciated that select application 275 can launch multiple applications simultaneously, which can either be executed within a processor (not shown) in display component 220 or in the application component. Data associated with the selected application can be rendered as support data 242.

(6) Database access allows access to data storage 225. Such access can be utilized for database maintenance, data searching, validation and algorithm development, and so on.

Display component 220 can also include a translation component 285 and an input component 295. Translation component 285 can facilitate utilization of positioning technologies, and interpretation of location information in various languages. For example, translation component can facilitate to receive directions in a foreign country. Translation component can operate in conjunction with emulation component 145 and format data 271. In an aspect, input component 295 can be embedded within display area 310, as it can be the case when utilization of features in the toolbar 255 can be achieved via a touch-screen-hardware, software, and firmware associated with a touch-screen mode of inputting information can embody input component 295. In another aspect, input component 295 can include a keyboard, which can include special and/or programmable keys to access features in to access specific features in toolbar 255. In yet another aspect, input component can correspond to software embedded in a computer-readable medium (e.g., stored in a memory, like data storage 125 in location based service platform 110 or in application component 190, for editing rules for technology selection, entering information or requests for information through voice commands. In a further aspect, input component 295 can include a biometric input sub-component that can introduce a security feature to input component 295. For example, in circumstances that location of classified entities, e.g., weapons, biological agents, toxic substances, radioactive fuel, etc., or personnel, such as secret service operatives or military troops and equipment is handled (e.g., transported, serviced, supported logistically, and so on), biometrics verification can ensure authorized personnel can have access to features accessible through toolbar 255, and compatible with the personnel member level of clearance.

Figure 3:
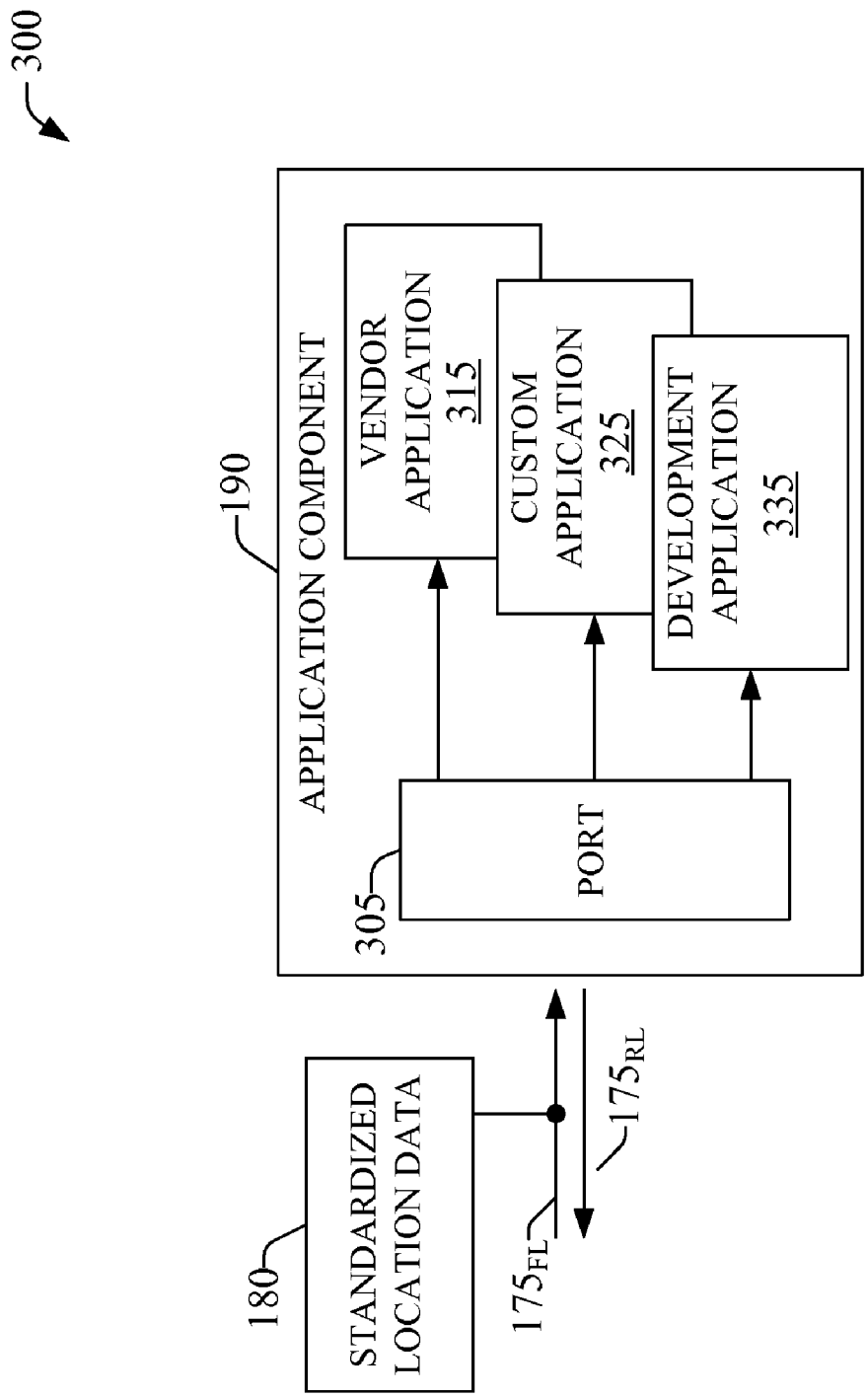
FIG. 3 illustrates an example application component that receives standardized location data generated by a location based service component.

FIG. 3 illustrates an example application component that receives standardized location data generated by a location based service component. Application component 190 receives standardized location data 180, e.g., a location position, or a fix, can be formatted as a longitude and latitude, as a geodetic datum, or it can be conveyed in terms of a distance, in miles or kilometers or other suitable length unit, with respect to a point of reference.

Standardized data 180 is received through communication forward link $175_{FL}$ in a port 305. In an aspect such port can be a serial port such as a USB port, an RS-232 port, a DB25 port, a parallel port, or an internal COM port. Application component 190 can include multiple applications that can be executed locally within the application component or remotely by a processor (not shown). In an aspect, an application can be a navigation application that delivers a fix to an operator of a location based service platform. In another aspect, an application can utilize standardized location data as a part of a specific positioning module within the application. An application cab be a vendor application 315 that utilizes a specific data format, a custom application 325 which can be an application programming interface that relies on metadata generated during processing location information, or a development application 335 that can employ location data as a reference to develop validation algorithm or correction models for specific location services or positioning technologies.

Figure 4:
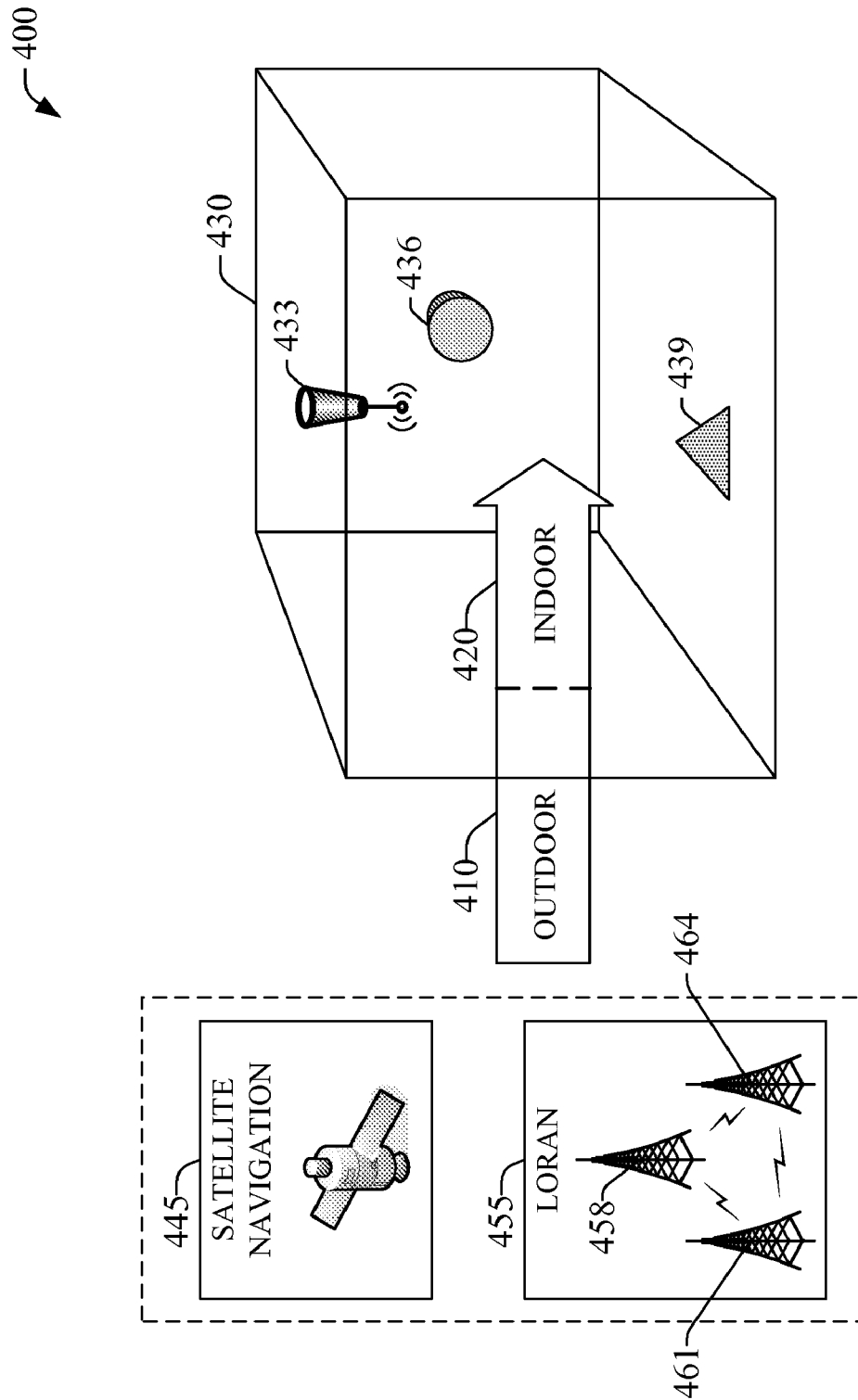
FIG. 4 illustrates an example technology framework that provides location data according to an aspect described in the subject specification.

FIG. 4 is a schematic diagram 400 that illustrates an example technology framework that facilitates providing location data to a location based service platform. Technologies (e.g., technologies 155$_1$-155N) can be suited for outdoor 410 or indoor 420 positioning, with specific technologies being adequate for both environments. In outdoor positioning 410, navigation technologies such as satellite navigation 445 (e.g., GPS, GLONNAS) and LORAN 455, which relies in three reference sources (458, 461, and 464) for space and maritime navigation, can be employed independently or complementary. For indoor positioning, wireless networks 433 (e.g., wireless local area network, or wireless wide area network) can provide location services for user equipment that can receive wireless traffic. In an aspect, wireless local area network tags mounted to known locations can act as beacons with a known position to improve location data accuracy in dynamic environments (e.g., environments that change configuration, relative positions of objects) wherein persons and goods change the characteristics of wireless channels and information propagation.

Additionally, in indoor environments, RFID tag 436 technology, which can be mounted in a fix location in a floor, wall, or roof, or environment furniture (e.g., a shelf), can convey positioning information that can be probed with an RFID scanner. In an aspect, such tags can be RFID active tags that are powered by a battery, or a solar energy cell, depending on the location of the tag. In another aspect, an RFID tag 436 can deliver location information when energized by an RFID probe instrument. RFID tag technology can deliver position information that can be static (e.g., position of an object in a facility area, a warehouse, an office, and so on). However, when combined with wireless technology 433, data contained in the RFID tag can be updated through wireless technology and thus can provide dynamic positioning information (e.g., navigation). Alternatively, or additionally, fix-mounted RFID tags can possess the most accurate location data and enhance less accurate positioning technologies (like technologies 155$_1$-155$_N$) while being scanned. It should be appreciated that temporal information, such as a "lifetime," to specify how long a scan can be expected to deliver valid location information can be necessary and thus delivered by RFID or barcode technologies.

It is noted that complementary to wireless 433 and RFID 436 technologies, location data can be extracted from barcode technology. Linear and two-dimensional symbologies can provide rich data associated with static information in a specific facility.

Figure 5:
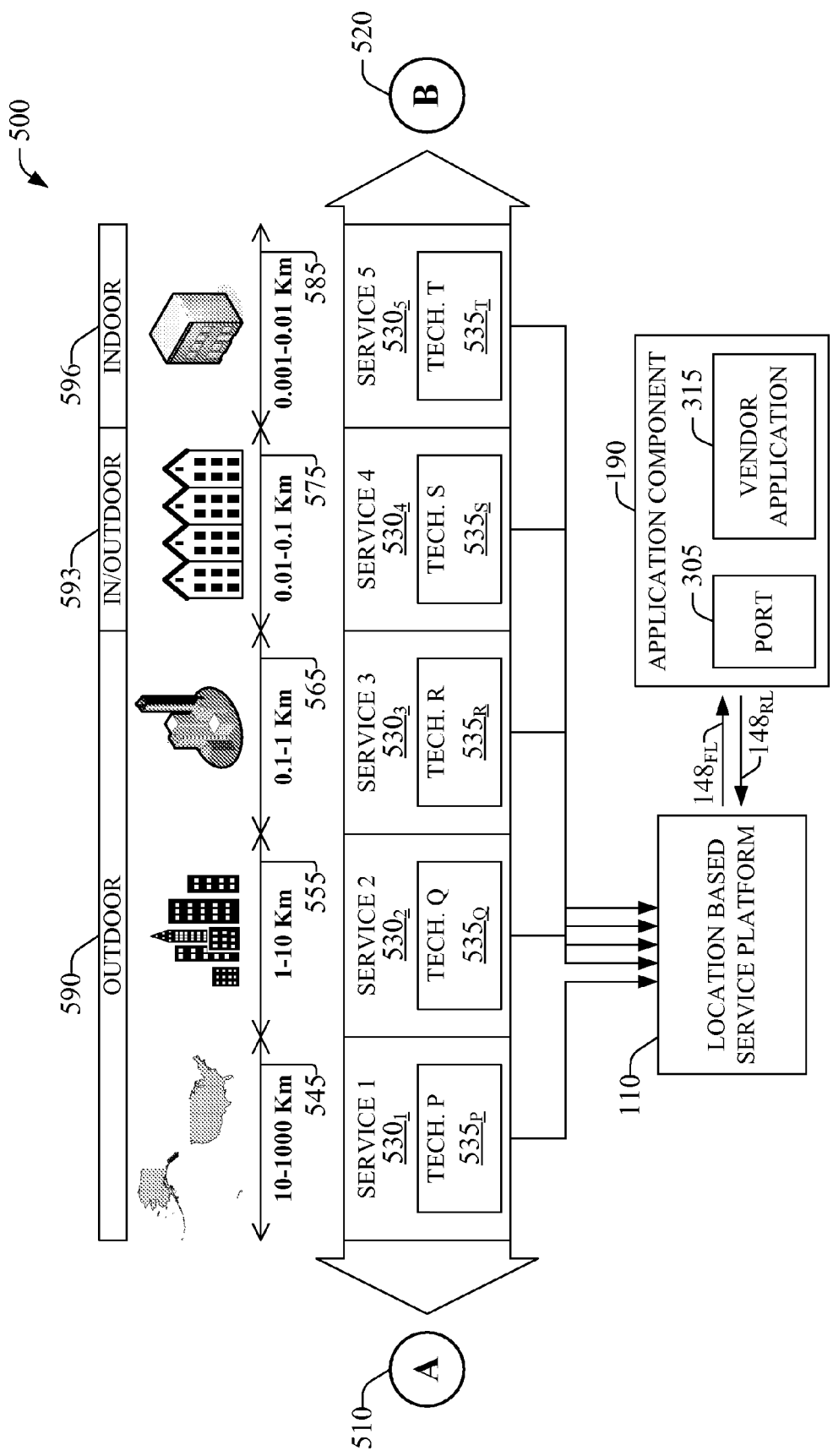
FIG. 5 illustrates integrated, seamless utilization of multiple location services over multiple length scales when navigation from a first destination to a second destination.

FIG. 5 is a schematic diagram 500 that illustrates integrated, seamless utilization of multiple location services over multiple length scales when navigation from a first destination to a second destination. A location based service platform 110 can be employed to navigate from a destination A 510 to a destination B 520 by seamlessly streaming standardized location data (e.g., standardized location data 180; not shown in FIG. 5) to an application component 190 that can execute a vendor navigation application 315 and receives the standardized location data through port 305 (as discussed above in connection with FIG. 3). In an aspect, multiple location services 530$_1$-530$_5$ that rely, respectively, on positioning technologies 535$_1$-535$_5$ can provide with location data according to multiple disparate length scales; e.g., interstate or inter-city length scale 545 ranging from 10-1000 Km, a city length scale 555 ranging from 1-10 Km, a downtown or neighborhood length scale 565 ranging from 0.1-1 Km, a campus (e.g., university campus) length scale 575 ranging from 0.01-0.1 Km, and a facility length scale 585 ranging from 0.001-0.01 Km. It should be appreciated that such multiple scales span outdoor environments 590, hybrid indoor/outdoor environments 593, and indoor environments 596.

In an aspect, door-to-door directions can be paperless, and can be emailed to a handheld terminal wherein location based service platform 110 resides. Directions can be conveyed to multiple portable as well as wearable devices, such as smart glasses, ear pieces, watches, and the like. Based on the directions, a specific route encompassing multiple length scales is devised. According to length scales, location based service platform 110, via a technology selection component 135 (or component 235) can select a specific service that utilizes a specific technology to receive location data. It should be appreciated that a service can rely on one or more technologies (e.g., technology 155$_1$-155$_N$) to deliver location data. In diagram 500, within inter-city length scale 545 a service 1 530$_1$ that utilized technology P 535$_P$ can be accessed. Upon a change in length scale, as a consequence of approaching, or having reached, a destination city, a second service 2 530$_2$ can be employed, and such service can be based on technology Q 535$_Q$. It should be appreciated that such service transition is seamless to an operator, as a technology interface component can receive location data from multiple positioning technologies, and a rule-based selection can automatically determine a change from service 1 530$_1$ to service 530$_2$. Similarly, a transition from service 2 530$_2$ to service 3 530$_3$ takes place, wherein service 3 530$_R$ can employ technology R 535$_R$. In diagram 500, as the location of destination B 520 is further approached, location based service platform 110 can seamlessly change to a service 4 530$_4$ and technology S 535$_S$ that can provide location data within an outdoor and indoor environment. In an aspect, service 530$_4$, can deliver location data associated with complementary services such as a "parking butler" or "virtual valet," which can lead an operator seeking destination B 520 to an empty parking spot in a parking lot, including having a parking fee debited directly from a credit card or bank account of the operator.

As a precise location associated with destination B 520 is reached, a still further seamless switch to an indoor service 5 530$_5$ and technology T 535$_T$ is seamlessly effected by location based service platform 110. As destination B 520 is searched within a facility, a facility plan can be displayed in a display component associated with platform 110. Vendor application 315 can also augment, or enrich, location data with available information associated with the facility, such as names of enterprises that occupy the facility, and office occupant names. A further level of data supplementation can include accessing an updated schedule of the person associated with destination B 520. As technology T 535$_T$ can provide with a resolution of a meter, a door-to-door trip can be accomplished, reaching destination B 520.

Figure 6:
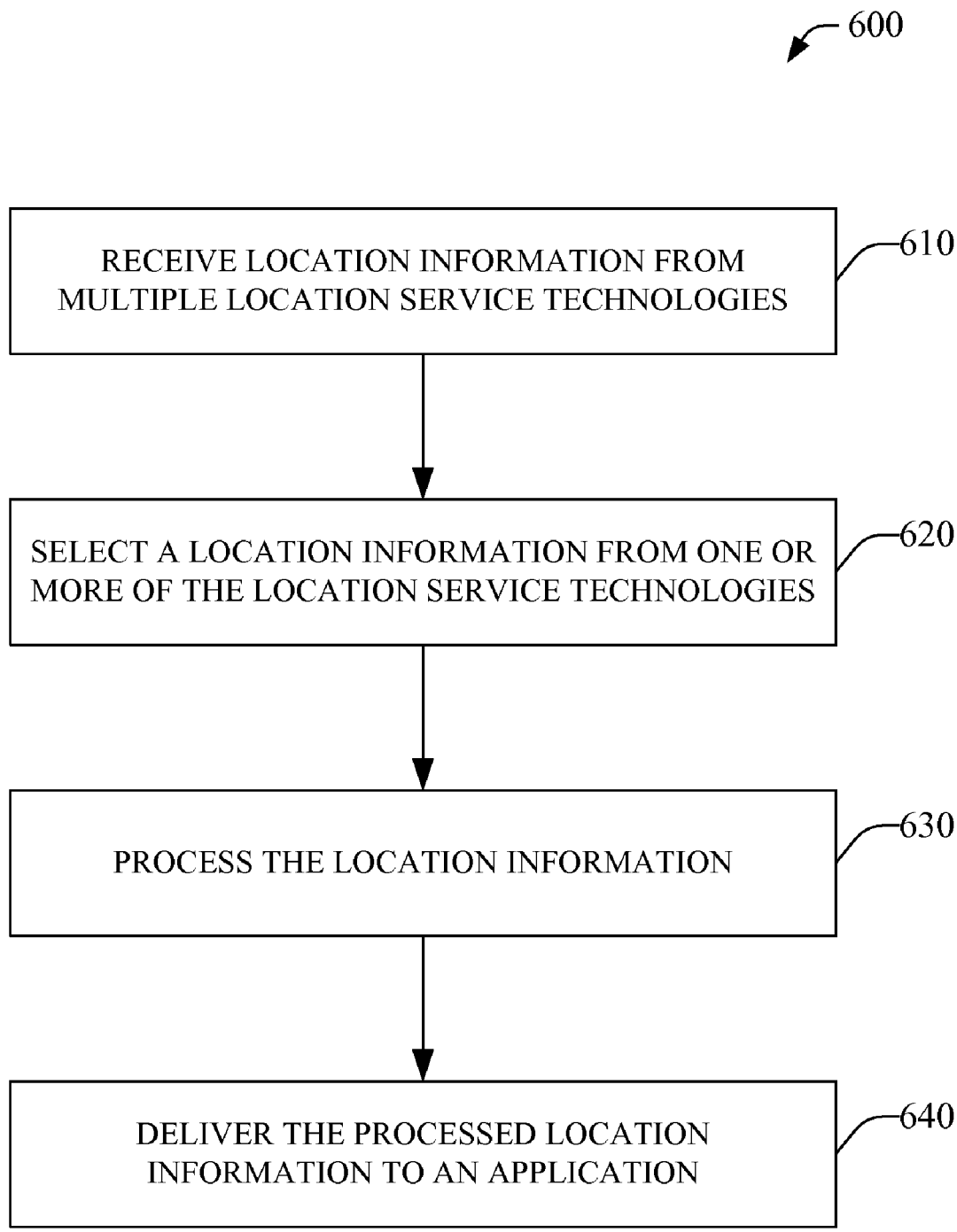
FIG. 6 presents a flowchart of an example method for utilizing integrated location data, or location information, in an application.
Figure 7:
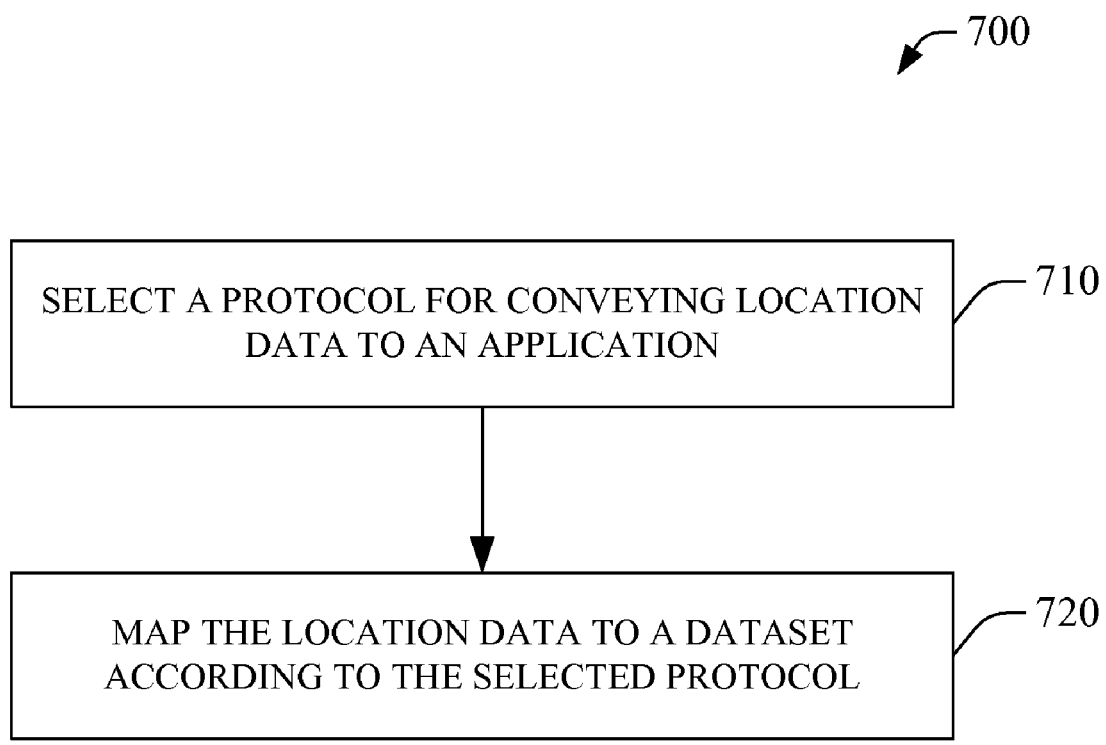
FIG. 7 presents a flowchart of an example method for generating standardized location data for an application.
Figure 8:
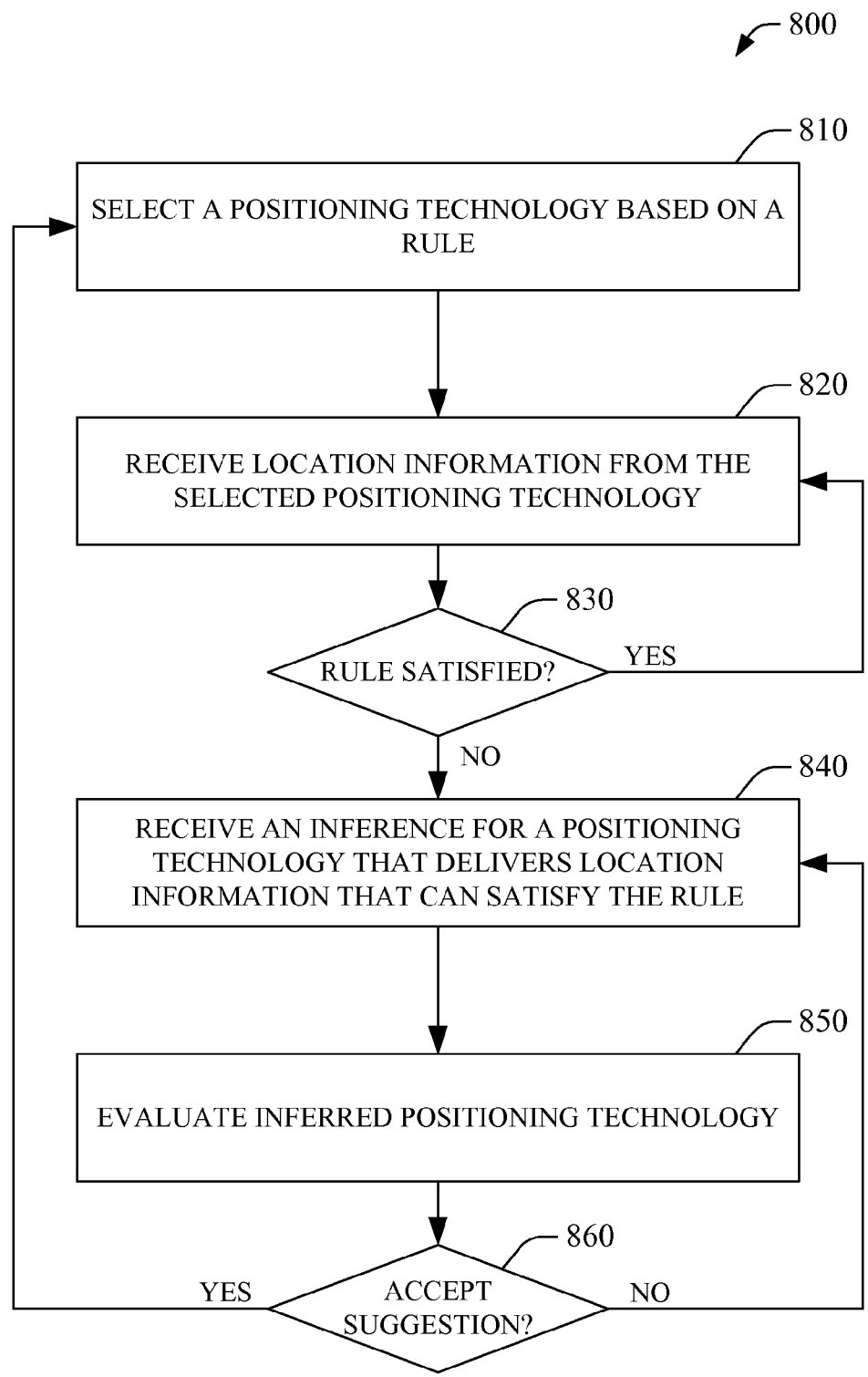
FIG. 8 presents a flowchart of an example method for selecting a positioning technology for receiving location data.

In view of the example systems presented and described above, methodologies that may be implemented in accordance with the disclosed subject matter, will be better appreciated with reference to the flowcharts of FIGS. 6-8. While, for purposes of simplicity of explanation, the methodologies are shown and described as a series of blocks, it is to be understood and appreciated that the disclosed aspects are not limited by the number or order of acts, as some acts may occur in different orders and/or concurrently with other blocks from what is depicted and described herein. Moreover, not all illustrated acts may be required to implement the methodologies described hereinafter. It is to be appreciated that the functionality associated with the blocks may be implemented by software, hardware, a combination thereof or any other suitable means (e.g., device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 6 presents a flowchart of an example method 600 for utilizing integrated location data, or location information, in an application. At act 610, location information is received from multiple location services. Location services can rely on various positioning technologies to generate the location information. Such technologies can be adequate for outdoor environments and can include satellite navigation technologies, earth-based technologies, such as LORAN and cellular wireless communication services. In addition, positioning technologies can be appropriate for indoor environments and can comprise wireless local area networks, RFID tags, and barcode labels. In an aspect, the location information is received and integrated through a technology interface component (e.g., component 115), which can receive data from multiple sources and can reside in a location based service platform (e.g., platform 110 or 210). It should be appreciated that a portion of the location data accessed through the technology interface component can be exposed to an operator interfacing with the location based service platform, whereas the remainder of the data can be exposed to the operator via specific agreements, such as on a fee-based scheme, or under specific conditions such as meeting specific security clearances in the case of classified location information.

At act 620, a location information from one or more of the location services is selected. Such location information is selected based on a set of rules, which can be basic rules established by a service provider that manages the location based service platform, or the set of rules can be operator-specific rules. In an aspect, rules can be valid for specific periods of time, or rules can be different based on the operator that is accessing the location information.

At act 630, the location information, or data is processed. Processing can typically include formatting the data according to a specific format standard or protocol, such as NMEA-0183 format. Moreover, processing can include merging location data from multiple sources or location services, or it cab comprise merging location data with supplemental data in order to provide an operator with a richer experience during manipulation and exploitation of the location data through a display component (e.g., display component 220). In an example, an operator can be a mail delivery associate that is delivering a door-to-door package in a facility that the associate is not familiar with, in such instance a plan of the facility can complement location information associated with directions available to the associate to improve the associate's efficiency and deliver superior service. It should be appreciated that the presentation of the augmented, or enriched data, can be delivered to a display component carried by the associate, and upon demand from the associate, either as a free service or a fee-based service. In another aspect, troops in a battlefield can receive augmented location data with enemy positions in addition to landscape survey details and other cartographic aspects of the battlefield. Troops can receive the augmented data in a wearable display component (e.g., in an embedded display in operation goggles, or in a helmet-mounted display. In yet another example, hunters can receive augmented location data displaying accurate location information of fellow hunters for accident prevention. Furthermore, data processing can include adjusting location data to metadata for utilization in specific applications such as a webpage generation or other web-based applications, or for incorporation into source code of applications such as custom navigation applications. In an example, metadata can be employed to annotate location data in specific applications.

At act 640, the processed location information is delivered to an application. The application can be a vendor application that utilizes a specific data format, an custom application or an application programmer interface that relies on metadata generated during processing location information (e.g., at act 630), or a development application that can employ location data as a reference to develop validation algorithm or correction models for specific location services or positioning technologies.

FIG. 7 presents a flowchart of an example method 700 for generating standardized location data for an application. At step 710 a protocol for conveying location data for an application is selected. Selection can be based on the type of application that utilizes the location data. Vendor applications that rely on a specific positioning technology can drive the selection toward a protocol that complies with the standard determined by such technology; for instance, a navigation application that employs GPS location data can utilize NMEA-0183 format, thus determining the protocol selection. Custom applications can utilize richer formats that include additional, or redundant, location information such as location data that results from merging location data from multiple technologies, such technologies thus drive the protocol selection. In an aspect, protocol selection can be performed through a display component (e.g., display component 220) coupled to a location based service platform (e.g., location based service platform 210). At step 720 the location data is mapped to a dataset according to the selected protocol. In an aspect, mapping data can include converting the location data to metadata, or rich dataset, for exporting the information to web-based applications, or for utilizing the location data in rich-display navigation applications. In an aspect, mapping the data can be performed by the location based service platform through an emulation component (e.g., component 145 or 245). Alternatively, a processor in an application component that executes the application can further map, or augment (with metadata, for example), standardized location data.

FIG. 8 presents a flowchart of an example method 800 for selecting a positioning technology for receiving location data. At act 810, a positioning technology or service is selected as a source of location data based on a rule. The rule can be a default rule provided by a service provider that maintains a location based service platform, or the rule can be an operator-specific rule that can be entered through a display component (e.g., display component 220) via a rule editor functionality (e.g., rule editor 263). In an aspect, the rule can establish acceptable levels of accuracy, cost, reliability (e.g., signal-to-noise ratio or bit-error rate), and the like, for location data. In an aspect, an operator (e.g., a technician) in an indoor environment can select a technology which can be a two-dimensional symbology barcode technology; such a selection can be driven by a rule based in reliability, as information in a barcode is typically associated with a specific item (e.g., a circuit panel, or switchboard communication panel) and comprises detailed information about such specific item (such as position of specific switches, or circuit elements (e.g., a digital/analog converter, or application specific processor)). In another aspect, a barcode can just deliver static location data associated with an item in a fixed location, affording substantially any application; e.g., an application that resides in an application component such as component 190). It should be appreciated that in an embodiment of a location based service platform, location data received from a barcode label, can be formatted and supplemented (via an emulation component 145, for example), and rendered in a rich graphic format (e.g., a three-dimensional rendition of a switchboard displaying elements and their connectivity) in a display component. It is noted that a barcode can contribute to filling coverage gaps wherein wireless technologies can be difficult to implement and a location based service platform that receives location data from a static technology is acceptable.

At act 820, location information is received from the selected positioning technology. Such information (e.g., location data) can be received through a communication link (e.g., reverse link $148_{RL}$), which can be a wired link or a wireless link. The integrity of the data with respect to satisfying the originating rule can be validated at act 830. In case the rule is satisfied, further location information is received employing the selected technology. In case the rule is not satisfied, an inference, or suggestion, for a positioning technology that can deliver location data according to the rule is received in act 840. Such inference, or suggestion, can originate in an artificial intelligent component (e.g., AI component 241) in a technology selection component 235. At act 850, the suggestion is evaluated, such evaluation can be conducted by an operator or it can be performed automatically by an evaluation component (not shown) in the location based service platform (e.g., platform 220). Act 860 is a validation act wherein the suggestion can be accepted and the positioning technology is selected, or the suggestion is rejected and a new inference is received by redirecting the method flow to act 840.

Figure 9:
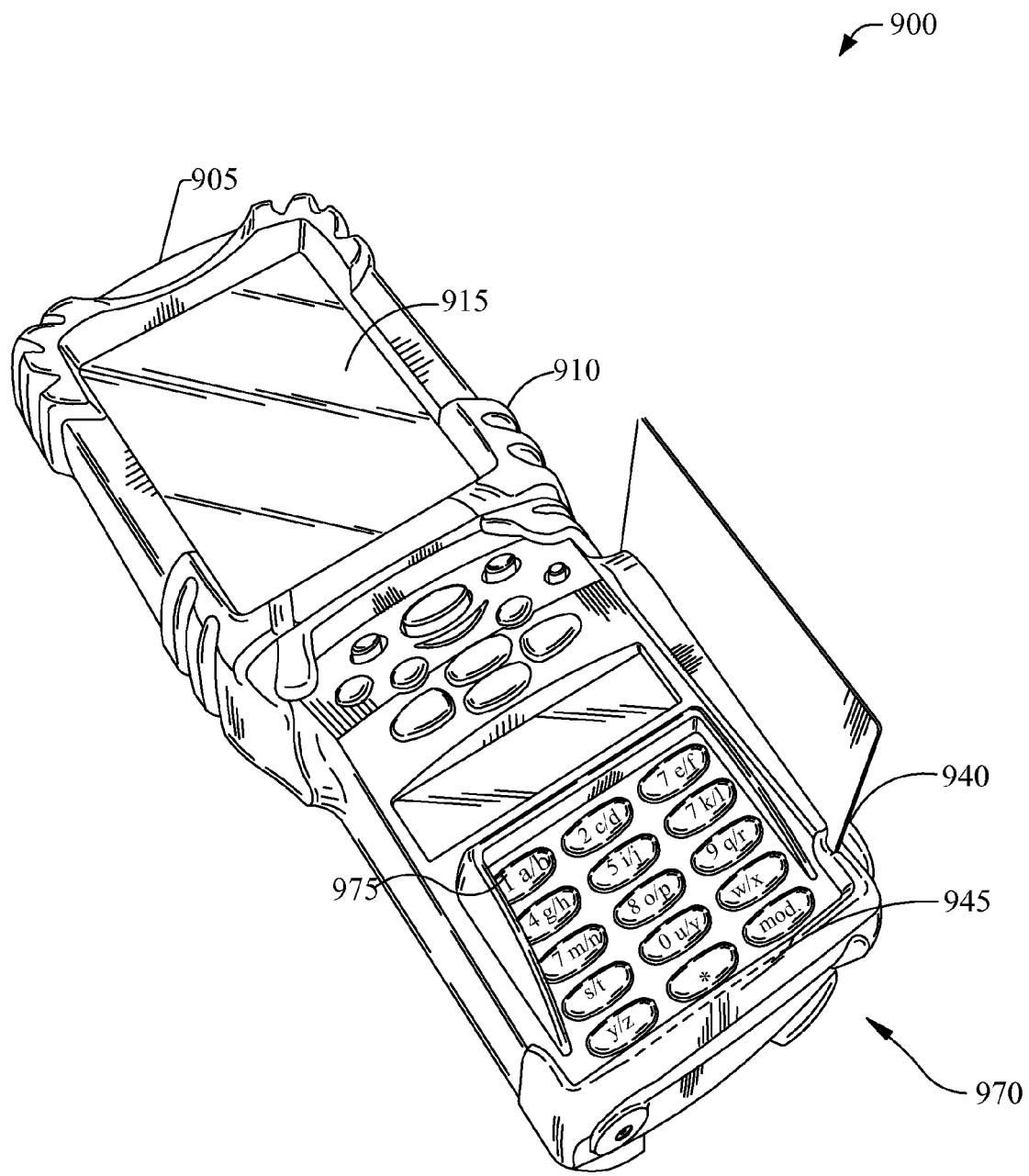
FIG. 9 illustrates an example handheld location based service platform in accordance with an aspect described in the subject disclosure.

FIG. 9 illustrates an example compact handheld location based service platform 900. Such location service based platform 900 includes integrated electronic circuitry for receiving location data from multiple disparate technologies, e.g., detection of radiofrequency waves and microwaves, as well as a barcode scanner component at an end window 905 in the handheld terminal. Additional electronics can be available to receive information for dead reckoning, such as linear and angular acceleration and speed, relative orientation data associated with handheld terminal 900, and so on. It is noted that location service based platform 900 can also includes a pen/wand light reader (not shown) that complements the barcode scanner component, and can act as a stylus to operate the location service based platform through a display component 915 (see below). A solid-state light-emitting diode LED (not shown) can act as the light source for the consolidated barcode scanner. A quantum-well or quantum-dot based IR light source (not shown) can also be employed to minimize noise in the detection/scanning of a bar code. Visual or aural indicia from display 915 or a speaker (not shown) can be presented to an operator of location service based platform 900 to indicate that a barcode has been successfully imaged and decoded, as well as data has been successfully collected from a set of item tags. Multiple antennas (not shown) facilitate operation of the consolidated technology interface component 905 for wireless communication with an RF access point; and an IR transceiver (not shown) for communication with an IR access point. Beamforming effected through said multiple antennas, in conjunction with a processor and additional electronic circuitry (not shown), can improve signal-to-noise interference by "focusing" the RF radiation emitted/received during data collection from item tags. It is noted that antennas and associated electronic component for wireless communication also facilitate communication location service based platform 900 with an external application component (not shown) via forward and reverse network links (not illustrated).

Compact handheld location service based platform 900 includes a housing 910 which can be constructed from a high strength plastic, metal, or any other suitable material. Location service based platform 900 is wireless and portable and includes a display component 915 that can render location data collected from multiple positioning technologies (e.g., technology $155_1$-$155_N$). Additionally, display 915 can present functionalities to display and manipulate specific location data, to communicate the location data to an application component (e.g., application component 190), which can be a stationary of portable device, as well as other information such as rules to select location data associated with a specific technology, location data existing in a database, cartographic renderings of the existing location data, and the like. It should be appreciated that the various functionalities that can be accessed through display component 915 can be executed, via a processor (not shown), by location based service platform 900. In an aspect, the display 915 can provide for a touch screen interface that can employ capacitive, resistive touch, infrared, surface acoustic wave, or grounded acoustic wave technology.

An input component embodied in a keypad 970, which can employ a varying surface and a raised grip protrusion 945 to facilitate utilization of the handheld location based service platform 900 in the field—e.g., during transportation of object bins such as $420_1$-$420_M$. In particular, the raised grip protrusion 945 facilitates holding location based service platform 900 in a secure position. The keypad 970 can include a top cover and a bottom cover that can be over molded around a common boundary. In an aspect, the top cover and the bottom cover can sandwich a plurality of associated keypad components (e.g., flex members, electroluminous panel, a silicone membrane with a plurality of keys thereupon printed circuit boards, LEDs, and the like). The common boundary can be formed by a surface area and/or line perimeter common to the top cover and the bottom cover, (e.g. a contact surface between top and bottom cover, a surface encapsulating the keypad components, edges of the stacked components and the like.) Typically, materials employed for fabricating the keypad's 970 top cover and bottom cover can include various types of polycarbonates, thermoset plastics, thermoformed plastic, and typically material that are capable of over molding to provide a suitable bondage between the top cover and the bottom cover. Moreover, the top cover can be fabricated with a transparent quality to provide for visual notification by illuminating a certain color or brightness on the keypad surface, when for example a particular key has been actuated. An audio herald, alone or in combination with visual indicia can be employed for indicating an operator that a particular item (e.g., item $165_j$) has been singulated.

The compact handheld location based service platform 900 can also include a magnetic strip reader 940 or other data capture mechanism (e.g., a signature and/or biometric feature capture pad; not shown) such as an infrared wireless interface, a USB port, an RS-232 port, a COM port, and the like.

Figure 10:
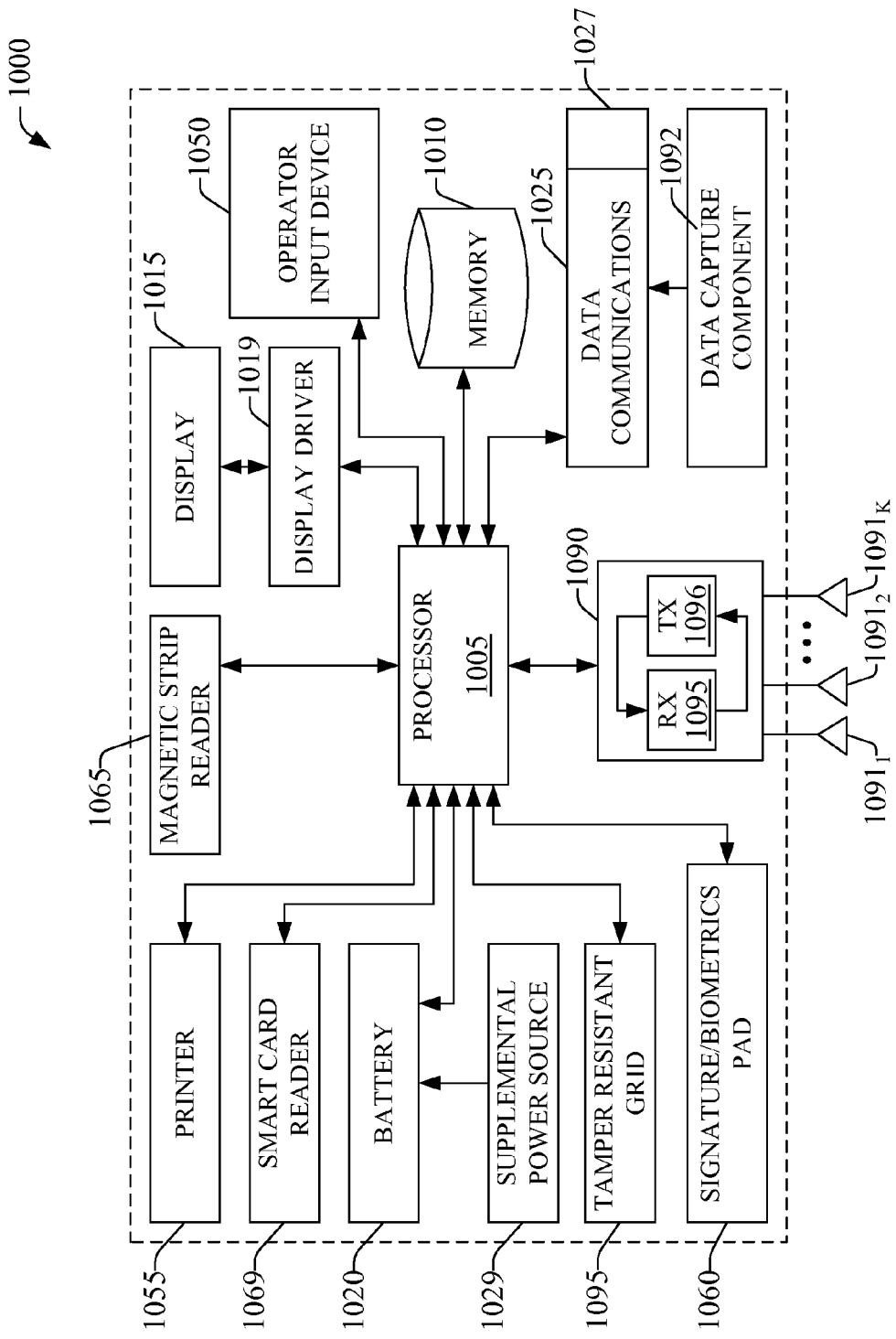
FIG. 10 illustrates a block diagram of an example electronic device that exploits the subject innovation.

With respect to FIG. 10, a schematic representation according to one aspect of the subject invention is shown in which a processor 1005 is responsible for controlling the general operation of a handheld terminal that can be utilized as a handheld location based service platform. The processor 1005 is programmed to control and operate the various components within the handheld terminal 1000 in order to carry out the various functions described herein. The processor or CPU 1005 can be any of a plurality of suitable processors. The manner in which the processor 1005 can be programmed to carry out the functions relating to the subject invention will be readily apparent to those having ordinary skill in the art based on the description provided herein.

A memory 1010 tied to the processor 1005 is also included in the handheld terminal 1000 and serves to store program code executed by the processor 1005 for carrying out operating functions of the handheld terminal 1000 as described herein. The memory 1010 also serves as a storage medium for temporarily storing information such as user defined functions and the like. The memory 1010 is adapted to store a complete set of the information to be displayed. According to one aspect, the memory 1010 has sufficient capacity to store multiple sets of information, and the processor 1005 could include a program for alternating or cycling between various sets of display information.

A display 1015 is coupled to the processor 1005 via a display driver system 1019. The display 1015 can be a liquid crystal display (LCD) or the like, or a monolithic, thin-film based electrochromic display. Display 1015 functions to display data or other information (e.g., toolbar 255) relating to specific aspects of operation described herein, e.g., with respect to a location based service platform such as platform 110, as well as ordinary operation of a handheld terminal 1000. For example, the display 1015 may display navigation information, available positioning technologies and services, and the like, which are displayed to an operator and may be transmitted over a communication link (e.g., link $175_{FL}$) to an application (such as an application 315, 325, or 335).

Additionally, the display 1015 may display a variety of functions that control the execution of the handheld terminal 1000. The display 1015 is capable of displaying both alpha-numeric and graphical characters. Power is provided to the processor 1005 and other components forming the handheld terminal 1000 by at least one battery 1020. In the event that the battery(s) 1020 fails or becomes disconnected from handheld terminal 1000, a supplemental power source 1029 can be employed to provide power to the processor 1005. For example, a thin-film solar-cell panel can embody such supplemental power source 1029, such thin-film can coat a portion of the surface of the device. The handheld terminal 1000 can enter a minimum current draw of sleep mode upon detection of a battery failure.

The handheld terminal 1000 includes a communication subsystem 1025 that includes a data communication port 1027, which is employed to interface the processor 1005 with the network via the host computer. The handheld terminal 1000 also optionally includes an RF section 1090 connected to the processor 1005. The RF section 1090 includes an RF receiver 1095, which can receive RF transmissions from the network for example via RL $168_{RL}$ or $238_{RL}$ and a set of antennas $1091_1$-$1901_K$, and demodulate the signal to obtain digital information modulated therein. The RF section 1090 also includes an RF transmitter 1096 for transmitting information to a computer on the network, for example, in response to an operator input at a operator input device 1050 (e.g., keypad, touch screen) or the completion of a transaction. Peripheral devices, such as a printer 1055, signature/biometrics pad 1060, magnetic strip reader 1065, and data capture device 1092 can also be coupled to the handheld terminal 1000 through the processor 1005. The handheld terminal 1000 can also include a tamper resistant grid 1031 to provide for secure payment transactions. If the handheld terminal is employed as payment terminal, it can be loaded with a special operating system. Moreover, if the handheld terminal 1000 is employed as a general purpose terminal, it can be loaded with a general purpose operating system.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other computer-readable media for storing information. The term "computer-readable medium" can include, without being limited to, wireless channels and various other media capable of storing, containing, and/or carrying instruction(s) and/or data.

As it employed in the subject specification, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multi-thread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "possess", "possessing", and variants thereof are used in either the detailed description or the claims, these terms are intended to be inclusive in a manner similar to the term "comprising".

What is claimed is:

1. A system that facilitates utilization of location data by an application, the system comprising:
   an interface component that collects location data from multiple positioning technologies, wherein at least one of the multiple positioning technologies is a radio frequency identification (RFID) technology;
   a component that selects location data according to a set of rules; and
   a component that formats the location data according to a standard and conveys a standardized set of data to an application component.

2. The system of claim 1, the interface component integrates the location data in a data storage.

3. The system of claim 1, one or more of the multiple positioning technologies generate location data for an outdoor environment.

4. The system of claim 1, one or more of the multiple positioning technologies generate location data for an indoor environment.

5. The system of claim 1, one or more of the multiple positioning technologies is a satellite navigation technology.

6. The system of claim 1, one or more of the multiple positioning technologies is a cellular wireless communication technology, the cellular wireless communication technology includes a wireless local area network.

7. The system of claim 1, one or more of the multiple positioning technologies is a barcode labeling technology.

8. The system of claim 1, the set of rules includes at least one of a set of custom rules or a set of rules inferred from historic location data or cost-benefit analysis.

9. The system of claim 1, the standard to format the location data includes the NMEA-0183 format.

10. The system of claim 1, the application component receives the standardized location data through a port, the port includes an internal COM port.

11. The system of claim 1, the application component includes at least one of a vendor application, a custom application, or a development application.

12. A method for utilizing integrated location information, the method comprising:
   receiving location information from a plurality of location services, wherein at least one of the location services is based on a radio frequency identification (RFID) technology;
   integrating the received location information from the plurality of the location services, integrating the location information includes storing said location information;
   selecting a subset of the stored location information according to a set of rules;
   processing the subset of location information, the processing includes augmenting the location information with metadata; and
   delivering the processed subset of location information.

13. The method of claim 12, selecting the subset of the stored location information according to a set of rules includes determining the set of rules based on at least one of an accuracy of the location information, a cost of the location information, or a reliability of the location information.

14. The method of claim 13, selecting the subset of the stored location information according to a set of rules further includes inferring a subset of the set of rules from a cost-benefit analysis.

15. The method of claim 12, further comprising:
   receiving an indication of a location service;
   evaluating whether the location information generated by the location service complies with a set of rules;
   selecting the indicated location information service as a source of location information.

16. The method of claim 12, processing the subset of location information further includes selecting a standard for delivering the subset of location information.

17. The method of claim 16, further comprising mapping the subset of location information to a dataset according to the selected standard.

18. A computer program product comprising a non-transitory computer-readable medium including:
   code for causing a computer to receive location information from a positioning technology, wherein the positioning technology is a radio frequency identification (RFID) technology;
   code for causing a computer to integrate the received location information from the positioning technology;
   code for causing a computer to map a subset of the location information that satisfy a selection rule to a dataset according to a specific format; and
   code for causing a computer to convey the dataset to an application.

19. The computer program product of claim 18, further comprising code for causing a computer to select the subset of location information according to at least one of an accuracy of the location information, a cost of the location information, and a reliability of the location information.

* * * * *

UNITED STATES PATENT AND TRADEMARK OFFICE
CERTIFICATE OF CORRECTION

PATENT NO.        : 8,073,795 B2
APPLICATION NO.   : 11/970336
DATED             : December 6, 2011
INVENTOR(S)       : Honisch Page 1 of 1

It is certified that error appears in the above-identified patent and that said Letters Patent is hereby corrected as shown below:

In Column 5, Line 17, delete "SNIR" and insert -- SINR --, therefor.

In Column 12, Line 66, delete "190)." and insert -- 190. --, therefor.

Signed and Sealed this
Eighteenth Day of December, 2012

David J. Kappos
*Director of the United States Patent and Trademark Office*